United States Patent [19]

Fleissner

[11] Patent Number: 6,105,451
[45] Date of Patent: Aug. 22, 2000

[54] DEVICE FOR ATTACHING A ROTATABLY MOUNTED HOLLOW CYCLINDER AT ITS OUTER CIRCUMFERENCE

[75] Inventor: Gerold Fleissner, Zug, Switzerland

[73] Assignee: Fleissner GmbH & Co., Maschinenfabrik, Egelsbach, Germany

[21] Appl. No.: 09/025,844

[22] Filed: Feb. 19, 1998

[30] Foreign Application Priority Data

Feb. 19, 1997 [DE] Germany .................. 197 06 344

[51] Int. Cl.⁷ .................. F16H 57/00; F16B 3/24
[52] U.S. Cl. .................. 74/431; 285/346; 403/291; 403/337
[58] Field of Search .................. 74/431, 432; 285/346; 403/291, 337

[56] References Cited

U.S. PATENT DOCUMENTS

| | | | |
|---|---|---|---|
| 2,334,663 | 11/1943 | Whitney | 285/346 X |
| 2,338,686 | 1/1944 | Gredell | 285/346 X |
| 4,406,484 | 9/1983 | Ramer | 285/346 X |

FOREIGN PATENT DOCUMENTS 217595  1/1985  Germany ..................... 285/346

*Primary Examiner*—Allan D. Herrmann
*Attorney, Agent, or Firm*—Antonelli, Terry, Stout & Kraus, LLP

[57] ABSTRACT

A hollow cylinder is fastened at its outer circumference when the cylindrical interior jacket is to be utilized for a treatment process. To produce this fastening, provision is made according to the invention for surrounding the end of the hollow cylinder by an elastic ring, said ring being pressed against the outer circumference of the hollow cylinder by a clamping disk that is annular and surrounds the hollow cylinder, said disk in turn being nonrotatably connected with the drive unit. The drive unit can then consist exclusively of a bearing ring connected by a gear at its outer circumference with a drive pinion of a motor.

4 Claims, 1 Drawing Sheet

DEVICE FOR ATTACHING A ROTATABLY MOUNTED HOLLOW CYCLINDER AT ITS OUTER CIRCUMFERENCE

BACKGROUND OF THE INVENTION

A hollow cylinder must be fastened at its outer circumference when the space inside the hollow cylinder is to be used for performing certain method processes unimpeded. This is the case for example when fibers or pulp are loaded at one end of such a hollow cylinder in order then to spin them out from the inside to the outside through the openings in the hollow cylinder, and especially to suck them out. The outward movement of the fibers from inside the hollow cylinder to produce a fleece from these fibers is reinforced by a needle roller mounted axially parallel in the vicinity of the inside circumference and rotating rapidly.

The hollow cylinder, in this case the permeable and therefor flexible hollow cylinder, must be rotatably mounted at its ends so that it can rotate around its lengthwise axis. It is known in practice to screw the hollow cylinder at both ends from the inside to the outside into a bearing ring and then to mount and drive the bearing ring externally on a plurality of wheels or rollers located pairwise opposite one another, said wheels or rollers engaging angular grooves provided in the outer circumference of the bearing ring. This bearing ring does leave the ends of the hollow cylinder open but it is too unstable, the hollow cylinder does not run true, at least in the long term, and there is a risk of the hollow cylinder tearing free from the bearing ring, especially because violent rotary movements are generated inside the hollow cylinder as the fleece is laid.

SUMMARY OF THE INVENTION

The goal of the invention is to provide an endwise connection of the hollow cylinder with a bearing or drive unit that produces a simple elastic circumferential mounting of the hollow cylinder on the unit.

To achieve the stated goal, provision is made according to the invention such that the end of the hollow cylinder is surrounded by an elastic ring, said ring being pressed against the outer circumference of the hollow cylinder by an annular clamping disk that surrounds the hollow cylinder, said disk in turn being nonrotatably connected with the bearing or drive unit. The hollow cylinder is hence no longer attached rigidly by several screws to its bearing ring, but is elastically nonrotatable so that it remains uniform all the way around. Hence, the connection is made forcewise but not shapewise. This connection is not only simple to produce but assembly can be performed rapidly, and the hollow cylinder can be replaced in short order. In addition, the entire mounting on the bearings as well as the design of the bearings is not radial in nature, which is advantageous when two such hollow cylinders are mounted close together.

Advantageously the clamping disk consists of dual clamping washers which, together with an annular groove formed between the elements of the dual washer and open radially toward the inside, surround the bearing ring radially and externally. When the dual clamping washers are screwed together, they press the bearing ring in the annular groove that is open radially inward, uniformly over the circumference against the hollow cylinder, thus holding it firmly in the circumferential direction. The two clamping disks are then in turn screwed to the bearing or drive unit.

Advantageously, the bearing or drive unit consists of a flange ring that is cylindrical and preferably flush with the inside diameter of the hollow cylinder, said flange ring being connected externally by a bearing surrounding the flange ring with a housing that supports the device. A gear can be shrunk directly onto the flange ring, said gear being engaged by a driven matching gear for driving the hollow cylinder rotationally from the housing.

BRIEF DESCRIPTION OF THE DRAWINGS

A device of the species according to the invention is shown as an example in the drawing.

DETAILED DESCRIPTION OF THE PREFERRED EMBODIMENTS

The hollow cylinder is designated 1. It can have a greater length and in particular can be perforated to be permeable. It is not dimensionally stable but has elastic mountings which function as it rotates around its lengthwise axis during operation. Inside the hollow cylinder, in the vicinity of its inner circumference, a brush roller is mounted rotatably and axially parallel, said brush roller serving to vorticize the fibers added endwise, but not shown here.

Figure 2:
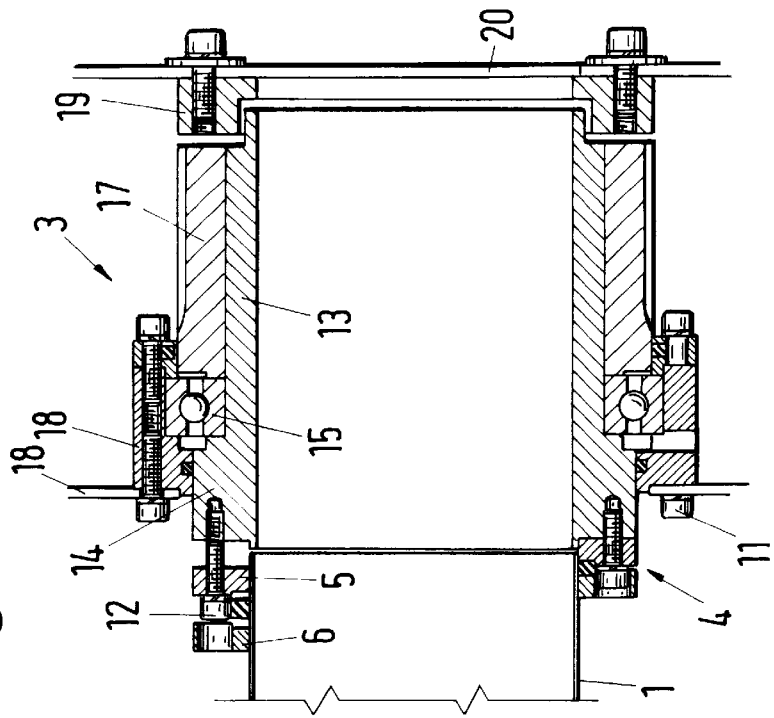
FIG. 2 is likewise a cross section of the other end of the hollow cylinder with a drive unit as the bearing ring.
Figure 1:
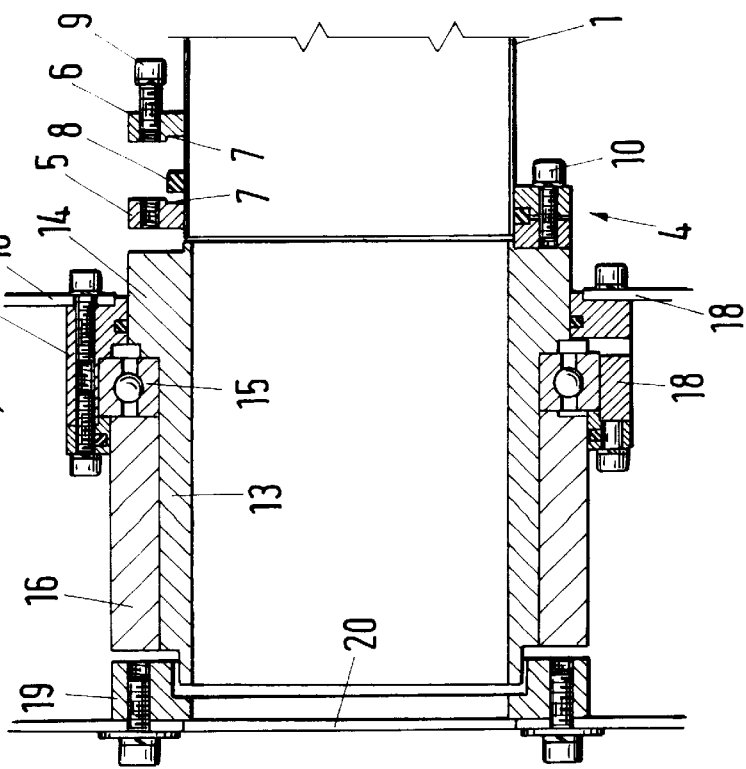
FIG. 1 is a cross section of one end of a hollow cylinder connected by an elastic connection with a bearing ring.

This hollow cylinder 1 is mounted endwise and driven to rotate around its lengthwise axis. For connection with bearing ring 2 according to FIG. 1 or with drive ring 3 according to FIG. 2, dual clamping washers 4 with two clamping disks 5 and 6 are provided at each end of hollow cylinder 1, said disks surrounding hollow cylinder 1 with only a slightly larger diameter. Between them, each of the two clamping disks 5 and 6 encloses half of an annular groove 7 that opens radially inward, into which groove an elastic ring 8 inserted at the outer circumference at hollow cylinder 1 fits. The inside diameter of annular groove 7, with dual clamping washers 4 screwed down, must be smaller than that of ring 8. When the two clamping washers 5 and 6 are screwed together by screws 9 and 10 as shown in FIG. 1, said screws being disposed uniformly around the circumference of dual clamping washers 4, as indicated in the case of screw 10, they press ring 8 against the outer circumference of hollow cylinder 1 and hold the latter firmly in the circumferential direction. Then, as shown in FIG. 2, when these dual clamping washers 4 are screwed to bearing ring 2 and drive ring 3 by screws 11, 12, which are likewise arranged uniformly around the circumference of dual clamping washers 4, the advantageously elastically firm connection of the hollow cylinder to bearing rings 2 and 3 is produced.

Both the bearing ring and drive ring 2 and 3 have the same inside diameter as hollow cylinder 1. Each consists of a broader flange ring 13 to whose radially external flange 14 dual clamping washers 4 are screwed and which a ball bearing 15 abuts. Ball bearing 15 is secured laterally at one end of hollow cylinder 1 as shown in FIG. 1 by means of a shrunk-on mounting ring 16 and at the other end of hollow cylinder 1 by a shrunk-on gear 17 as shown in FIG. 2. Ball bearing 15 is linked radially externally with fixed, i.e. nonrotating, housing 18. A labyrinth sealing ring 19 is located at each of the two open ends of flange ring 13, said rings 19 in turn being screwed to a wall 20 of housing 18. Therefore, by means of ball bearings 15, hollow cylinder 1 is rotatably mounted in bearing and drive rings 2, 3 on fixed housing 18, 20. Drive ring 3 is driven along at lengthwise axis by means of a pinion gear that meshes with gear 17. The two ends of hollow cylinder 1 and those of bearing rings 2, 3 are open to allow materials to enter and leave. The entry and departure of the materials take place through openings, not shown, in housing wall 20.

What I claim is:

1. A rotatable hollow cylinder mounted to a bearing or drive unit, comprising:

a rotatable hollow cylinder having a cylindrical inside jacket;

a rotatable bearing or drive unit having a cylindrical flange ring, the inside diameter of which is substantially equal to the inside diameter of the hollow cylinder, the bearing or drive unit being connected to a housing by a bearing surrounding the bearing or drive unit and allowing rotation of the bearing or drive unit about its longitudinal axis; and a fastening device fastening the bearing or drive unit to the hollow cylinder, the fastening device comprising an elastic ring surrounding the hollow cylinder near an end thereof, and an annular clamping disk clamping the elastic ring and pressing the elastic ring against the hollow cylinder, the fastening device being connected to the cylindrical flange ring of the bearing or drive unit to connect the hollow cylinder to the bearing or drive unit so that the cylindrical flange ring and the hollow cylinder rotate together.

2. A rotatable hollow cylinder mounted to a bearing or drive unit according to claim 1, wherein the annular clamping disk comprises a pair of clamping washers connected together and connected to the cylindrical flange ring of the bearing or drive unit, the pair of clamping washers including an annular groove between them that opens radially inwardly, the elastic ring being clamped in the annular groove.

3. A rotatable hollow cylinder mounted to a bearing or drive unit according to claim 2, wherein the pair of clamping washers are connected together and connected to the cylindrical flange ring by screws.

4. A rotatable hollow cylinder mounted to a bearing or drive unit according to claim 2, wherein a width of the annular groove is smaller than a width of the elastic ring, whereby connecting of the clamping washers together presses the elastic ring against the hollow cylinder.

\* \* \* \* \*